(12) United States Patent
Riedy et al.

(10) Patent No.: US 6,265,662 B1
(45) Date of Patent: Jul. 24, 2001

(54) FLOOR BOX ASSEMBLY

(75) Inventors: Charles H. Riedy, Lakewood; Dennis P. Revlock, Sr., Eastlake, both of OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 09/434,618

(22) Filed: Nov. 5, 1999

(51) Int. Cl.[7] ................................................. H02G 3/14
(52) U.S. Cl. ................................ 174/67; 174/66; 220/3.8
(58) Field of Search .................................. 174/48, 50, 53, 174/58, 66, 67; 220/242, 3.8, 4.02, 241; 292/336, 111, 80, 101, 10, 34, 37

(56) References Cited

U.S. PATENT DOCUMENTS

| | | | |
|---|---|---|---|
| 754,452 | | 3/1904 | Howe ........................ 292/10 |
| 782,115 | | 2/1905 | Dyer ......................... 292/80 |
| 1,589,352 | | 6/1926 | Boardman ................... 292/152 |
| 3,100,557 | | 8/1963 | Getzin ....................... 292/87 |
| 4,134,516 | * | 1/1979 | Sullo ......................... 220/242 |
| 4,197,959 | * | 4/1980 | Kramer ....................... 220/242 |
| 4,443,654 | * | 4/1984 | Flachbarth et al. ........... 174/48 |
| 4,451,101 | * | 5/1984 | Davis ........................ 174/67 |
| 4,994,631 | * | 2/1991 | Williams, Jr. ................ 174/67 |
| 5,010,211 | * | 4/1991 | Bartee ....................... 174/48 |
| 5,030,118 | * | 7/1991 | Burks ........................ 439/138 |
| 5,171,939 | * | 12/1992 | Shotey ....................... 174/67 |
| 5,422,434 | * | 6/1995 | Wuertz et al. ................ 174/67 |
| 5,430,253 | * | 7/1995 | Pratt ........................ 174/67 |
| 5,455,388 | * | 10/1995 | Pratt ........................ 174/67 |
| 5,558,386 | | 9/1996 | Tilly et al. ................. 292/65.05 |
| 5,627,340 | | 5/1997 | Smith et al. ................ 174/53 |
| 5,779,083 | * | 7/1998 | Bordwell .................... 220/242 |
| 5,796,037 | * | 8/1998 | Young et al. ................ 174/58 |
| 5,866,845 | * | 2/1999 | Markiewicz ................. 174/66 |
| 6,061,983 | * | 5/2000 | McCleskey ................... 52/220.1 |

\* cited by examiner

*Primary Examiner*—Dean A. Reichard
*Assistant Examiner*—Angel R. Estrada
(74) *Attorney, Agent, or Firm*—Jones, Day, Reavis & Pogue

(57) ABSTRACT

An apparatus for use with an electrical receptacle and a floor box. A first part of the apparatus defines a floor plate which is configured to fit over the floor box in an installed position. The floor plate has an inner edge surface defining an access opening for providing access to the receptacle. A second part of the apparatus defines an access door for closing the access opening. A detent structure is operative between the door and the floor plate to retain the door releaseably in the closed position. The detent structure includes an elongated spring which is mounted on one of the parts, and also includes a cam surface on the other part. A first end portion of the spring is anchored to the part on which it is mounted. A second end portion of the spring defines a cam follower. An intermediate portion of the spring supports the second end portion for movement pivotally about the first end portion against a bias of the spring upon sliding movement of the cam follower across the cam surface as the door moves to its closed position.

6 Claims, 3 Drawing Sheets

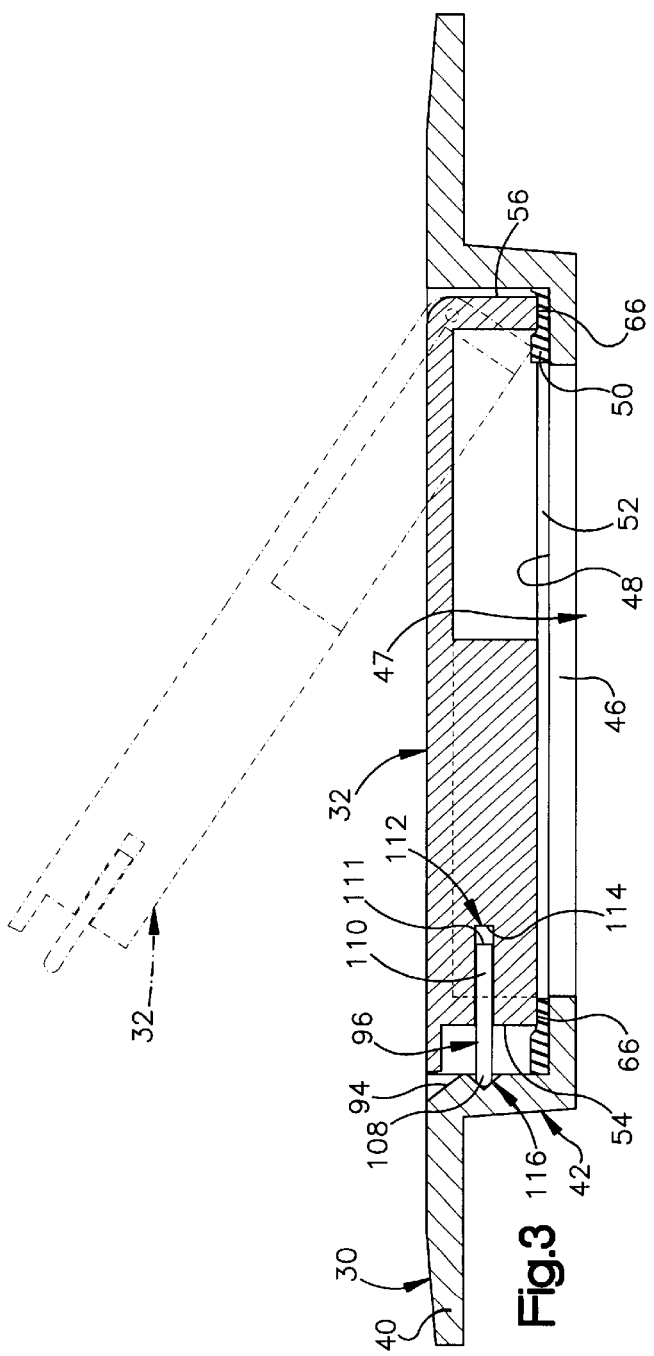
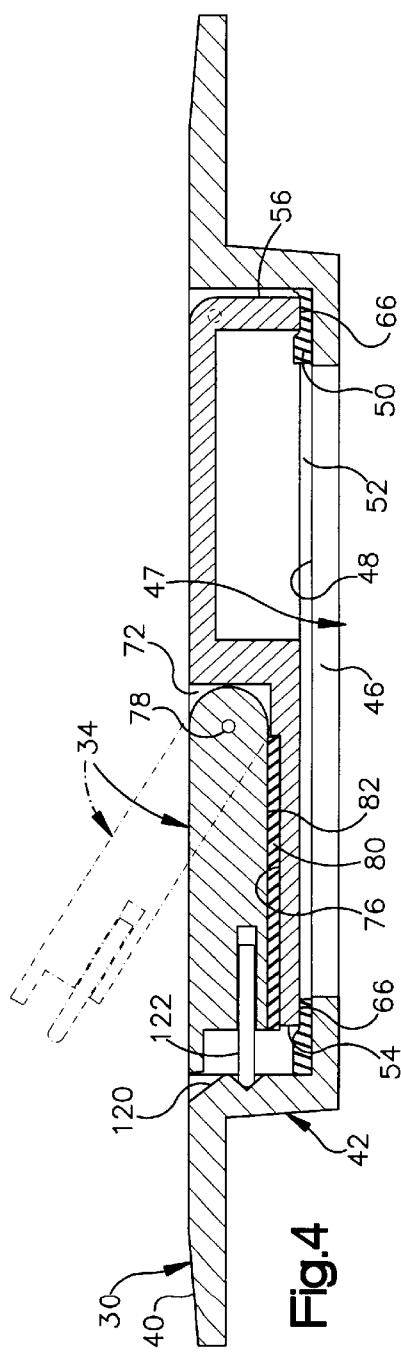

FLOOR BOX ASSEMBLY

FIELD OF THE INVENTION

The present invention relates to cover assemblies for floor mounted electrical receptacles.

BACKGROUND OF THE INVENTION

A floor mounted electrical receptacle is typically contained in a structure known as a floor box. Electrical power lines are routed upward to the receptacle through an open lower end of the floor box. A cover assembly at the floor surface conceals the floor box from view and has an access door that can be opened for access to the receptacle in the floor box.

SUMMARY OF THE INVENTION

The present invention comprises an apparatus for use with an electrical receptacle and a floor box. A first part of the apparatus defines a floor plate which is configured to fit over the floor box in an installed position. The floor plate has an inner edge surface defining an access opening for providing access to the receptacle. A second part of the apparatus defines an access door which is pivotal into and out of a closed position in which it closes the access opening.

The apparatus further includes a detent structure which is operative between the door and the floor plate to retain the door releaseably in the closed position. The detent structure includes an elongated spring which is mounted on one of those parts, and also includes a cam surface on the other part. A first end portion of the spring is anchored to the part on which it is mounted. A second end portion of the spring defines a cam follower. An intermediate portion of the spring supports the second end portion for movement pivotally about the first end portion against a bias of the spring. This occurs upon sliding movement of the cam follower across the cam surface as the door moves to the closed position.

BRIEF DESCRIPTION OF THE DRAWINGS

FIG. 3 is a view taken on line 3—3 of FIG. 2; and

FIG. 4 is a view taken on line 4—4 of FIG. 2.

DESCRIPTION OF A PREFERRED EMBODIMENT

Figure 1:
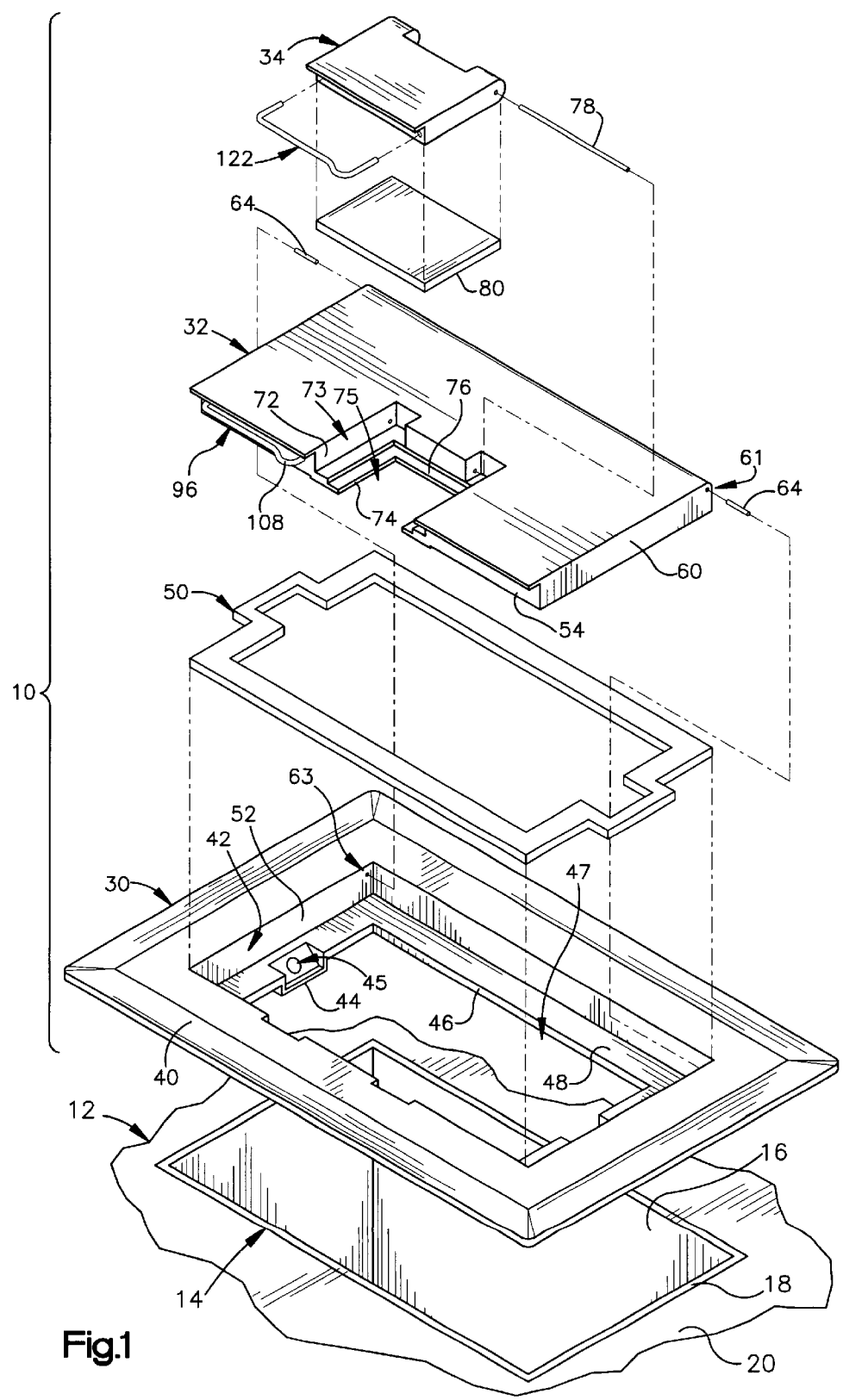
FIG. 1 is an exploded view of parts of an apparatus comprising a preferred embodiment of the present invention.

A preferred embodiment of the present invention is a cover assembly 10 which includes a plurality of parts that are shown separately in FIG. 1. Also shown in FIG. 1 is a concrete floor 12 and a rectangular floor box 14 embedded in the floor 12. An open upper end portion 16 of the floor box 14 has an edge surface 18 substantially flush with the surrounding surface 20 of the floor 12. The cover assembly 10 is configured to cover an electrical receptacle (not shown) in the floor box 14 when the cover assembly 10 is fully assembled and installed over the floor box 14.

Figure 2:
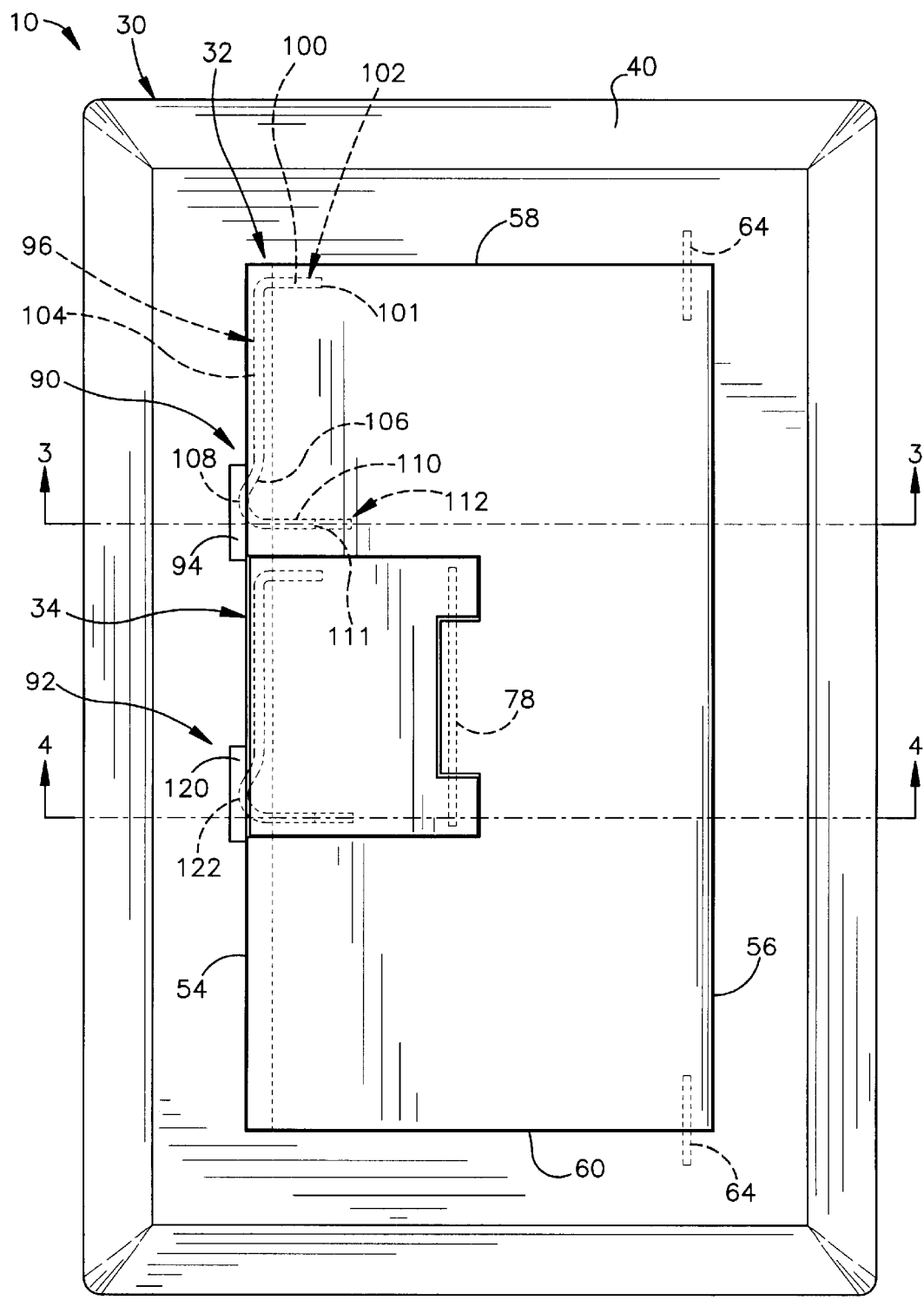
FIG. 2 is a top view showing the parts of FIG. 1 in an interconnected relationship.

The separate parts of the cover assembly 10 include a floor plate 30, a first access door 32, and a second access door 34. These parts of the cover assembly 10 are formed of a metal material, such as brass, but may alternatively be formed of any suitable plastic or composite material. When the separate parts of the cover assembly 10 are interconnected, as shown in FIG. 2, the first door 32 is mounted on the floor plate 30 and the second door 34 is mounted on the first door 32.

The floor plate 30 has a peripheral flange 40 projecting transversely from a recessed structure 42. The recessed structure 42, which is best shown in FIGS. 3 and 4, has a rectangular peripheral configuration and is thus receivable closely within the open upper end portion 16 of the floor box 14 to support the floor plate 30 in an installed position. When the floor plate 30 is in its installed position, the flange 40 projects transversely outward beyond the upper edge surface 18 of the floor box 14 to partially overlie the surrounding floor surface 20. A pair of opposed mounting structures 44, one of which is visible in FIG. 1, have apertures 45 for receiving fasteners that fasten the floor plate 30 to floor box 14 in a known manner.

The recessed structure 42 on the floor plate 30 has an inner edge surface 46. The inner edge surface 46 defines a rectangular access opening 47 for providing access to the electrical receptacle which, as further known in the art, also is supported by the retainer ring. A planar shoulder surface 48 on the recessed structure 42 surrounds the access opening 47. The shoulder surface 48 supports a gasket 50 in an installed position in which the gasket 50 overlies the shoulder surface 48 coextensively around the access opening 47. An inner wall surface 52 on the recessed structure 42 surrounds the shoulder surface 48 and is configured as a frame for the first door 32.

The first door 32 has a pair of opposite side edge surfaces 54 and 56 extending longitudinally between a pair of opposite end edge surfaces 58 and 60. When the first door 32 is mounted on the floor plate 30, a pair of apertures 61 at the end edge surfaces 60 are aligned with a pair of apertures 63 at the inner wall surface 52 of the floor plate 30. A corresponding pair of hinge pins 64 are received in the aligned apertures 61 and 63 to support the door 32 for pivotal movement into and out of a closed position in which the door 32 closes the access opening 47, as shown in FIGS. 2 and 3. The gasket 50 is deflected compressively beneath a peripheral lower edge surface 66 of the door 32 when the door 32 is in the closed position.

The first door 32 further has an inner edge surface 72 (FIG. 1). The inner edge surface 72 traverses three sides of a door frame area 73 in which the second door 34 is received. An additional inner edge surface 74 of the first door 32 traverses three-sides of a corresponding access opening 75. Like the access opening 47 in the floor plate 30, the access opening 75 in the first door 32 is configured to provide access to the electrical receptacle. A planar shoulder surface 76 also extends along three-sides of the access opening 75.

A single hinge pin 78 supports the second door 34 for pivotal movement into and out of a closed position. When the second door 34 is in its closed position, as shown in FIGS. 2 and 4, it closes the second access opening 75. A corresponding gasket 80 is then deflected compressively between the shoulder surface 76 and a peripheral lower edge surface 82 of the second door 34.

In accordance with the present invention, the cover assembly 10 is equipped with first and second detent structures 90 and 92 (FIG. 2). The detent structures 90 and 92 are operative between the floor plate 30 and the doors 32 and 34 to retain the doors 32 and 34 releaseably in their closed positions.

Specifically, the first detent structure 90 includes a cam surface 94 on the floor plate 30, and further includes a bent wire spring 96 which is mounted on the first door 32. A first end portion 100 of the spring 96 has a linear configuration and defines the first terminal end 101 of the spring 96. The first end portion 100 is received within a bore 102 that extends inward from the side edge surface 54 at a location near one end of the door 32. The first end portion 100 of the spring 96 is constrained from moving longitudinally within the bore 102. This can be accomplished by the use of an adhesive and/or an interference fit.

An intermediate portion 104 of the spring 96 also has a linear configuration, and extends longitudinally alongside the side edge surface 54 of the door 32. A second end portion 106 of the spring 96 has an arcuate section and a linear section 110. The arcuate section is configured as a cam follower 108. The linear section 110 defines the second terminal end 111 of the spring 96, and is received within a corresponding bore 112 in the door 32. Importantly, the second terminal end 111 of the spring 96 is spaced from the inner end 114 (FIG. 3) of the bore 112, and the linear section 110 of the spring 96 is movable longitudinally within the bore 112.

When the first door 32 is moved pivotally from an open position, as shown in phantom view in FIG. 3, to the closed position of FIG. 3, the cam follower 108 slides downward across the cam surface 94 on the floor plate 30 and snaps into an undercut space 116 beneath the cam surface 94. The cam follower 108 moves from left to right, as viewed in FIGS. 2 and 3, as it slides downward across the cam surface 94. The second end portion 106 of the spring 96 is thus forced to move pivotally about the first end portion 100 in a counter-clockwise direction, as viewed in FIG. 2, against a bias of the spring 96. The space at the inner end 114 of the bore 112 enables the second end portion 106 of the spring 96 to move relative to the first end portion 100, and also relative to the door 32, in this manner. The bias of the spring 96 then causes the cam follower 108 to snap back outward into the undercut space 116 so as to retain the door 32 releaseably in the closed position.

The second detent structure 92 is substantially the same as the first detent structure 90. Accordingly, the second detent structure 92 includes a cam surface 120 and a spring 122 which interact between the floor plate 30 and the second door 34 in the manner described above.

The present invention has been described with reference to a preferred embodiment. Those skilled in the art will perceive improvements, changes and modifications. Such improvements, changes and modifications are intended to be within the scope of the claims.

What is claimed is:

1. Apparatus for use with an electrical receptacle and a floor box, said apparatus comprising:

a first part defining a floor plate configured to fit over the floor box in an installed position, said floor plate having an inner edge surface defining an access opening for providing access to the electrical receptacle;

a second part defining an access door which is pivotal into and out of a closed position in which said door closes said opening; and a detent structure which is operative between said door and said floor plate to retain said door releaseably in said closed position, said detent structure comprising an elongated spring on one of said parts and a cam surface on the other of said parts;

said spring having a first end portion anchored to said one part, a second end portion defining a cam follower, and an intermediate portion supporting said second end portion for movement pivotally about said first end portion, said intermediate portion thereby supporting said cam follower to move against a bias of said spring upon sliding movement of said cam follower across said cam surface as said door moves to said closed position.

2. Apparatus as defined in claim 1 wherein said spring is a bent wire spring.

3. Apparatus as defined in claim 2 wherein said one part is said first part and said other part is said second part.

4. Apparatus as defined in claim 2 wherein said second end portion of said spring has an arcuate section configured as said cam follower, and further has a linear terminal end section which is movable longitudinally within an aperture in said one part upon said pivotal movement of said second end portion.

5. Apparatus as defined in claim 2 wherein said door has a peripheral edge surface which extends alongside an opposed inner surface of said floor plate when said door is in said closed position, and said intermediate portion of said spring extends longitudinally alongside said surfaces between said surfaces when said door is in said closed position.

6. Apparatus as defined in claim 5 wherein said first end portion of said spring is received in a corresponding bore in said one part.

* * * * *